(12) United States Patent
Casillas et al.

(10) Patent No.: US 7,706,577 B1
(45) Date of Patent: Apr. 27, 2010

(54) EXPORTING EXTRACTED FACES

(75) Inventors: Amy Casillas, San Jose, CA (US);
Lubomir Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 572 days.

(21) Appl. No.: 11/341,808

(22) Filed: Jan. 26, 2006

(51) Int. Cl.
*G06K 9/00* (2006.01)
(52) U.S. Cl. .................... 382/118; 382/181; 382/305
(58) Field of Classification Search ................ 382/118, 382/305, 181
See application file for complete search history.

(56) References Cited

U.S. PATENT DOCUMENTS

| | | | |
|---|---|---|---|
| 4,651,146 A | 3/1987 | Lucash et al. | |
| 5,943,093 A | 8/1999 | Anderson et al. | |
| 5,963,203 A | 10/1999 | Goldberg et al. | |
| 6,182,069 B1 | 1/2001 | Niblack et al. | |
| 6,324,555 B1 | 11/2001 | Sites | |
| 6,366,296 B1 | 4/2002 | Boreczky et al. | |
| 6,714,672 B1 | 3/2004 | Berestov et al. | |
| 6,728,728 B2 | 4/2004 | Spiegler et al. | |
| 6,879,709 B2 | 4/2005 | Tian et al. | |
| 6,940,545 B1 | 9/2005 | Ray et al. | |
| 7,155,036 B2 | 12/2006 | Li | |
| 7,171,023 B2 | 1/2007 | Kim et al. | |
| 7,274,832 B2 | 9/2007 | Nicponski | |
| 7,343,365 B2 | 3/2008 | Farnham et al. | |
| 7,403,642 B2 | 7/2008 | Zhang et al. | |
| 7,477,805 B2 | 1/2009 | Ohtsuka et al. | |
| 7,519,200 B2 * | 4/2009 | Gokturk et al. ............. | 382/118 |
| 7,587,101 B1 | 9/2009 | Bourdev | |
| 2001/0053292 A1 | 12/2001 | Nakamura | |
| 2002/0074398 A1 | 6/2002 | Lancos et al. | |
| 2002/0103813 A1 | 8/2002 | Frigon | |
| 2003/0023754 A1 | 1/2003 | Eichstadt et al. | |
| 2003/0033296 A1 | 2/2003 | Rothmuller et al. | |
| 2003/0210808 A1 | 11/2003 | Chen et al. | |
| 2004/0008906 A1 * | 1/2004 | Webb ........................ | 382/306 |
| 2004/0017930 A1 | 1/2004 | Kim et al. | |
| 2004/0060976 A1 | 4/2004 | Blazey et al. | |
| 2004/0064455 A1 | 4/2004 | Rosenzweig et al. | |
| 2004/0101212 A1 * | 5/2004 | Fedorovskaya et al. ..... | 382/305 |
| 2004/0204635 A1 | 10/2004 | Scharf et al. | |
| 2004/0267612 A1 | 12/2004 | Veach | |
| 2005/0011959 A1 | 1/2005 | Grosvenor | |
| 2005/0013488 A1 * | 1/2005 | Hashimoto et al. .......... | 382/216 |
| 2005/0025376 A1 * | 2/2005 | Ishida ........................ | 382/254 |
| 2005/0041114 A1 * | 2/2005 | Kagaya .................... | 348/222.1 |
| 2005/0046730 A1 | 3/2005 | Li | |
| 2005/0050027 A1 | 3/2005 | Yeh et al. | |
| 2005/0063568 A1 | 3/2005 | Sun et al. | |

(Continued)

OTHER PUBLICATIONS

Jennifer Granick, "Face It: Privacy Is Endangered", Dec. 7, 2005.

(Continued)

*Primary Examiner*—Jon Chang
(74) *Attorney, Agent, or Firm*—Van Pelt, Yi & James LLP

(57) ABSTRACT

Exporting information is disclosed. An object resulting from automatic detection performed on an image is received. An indication to export information is received. Data associated with the object is exported.

23 Claims, 16 Drawing Sheets

U.S. PATENT DOCUMENTS

| | | | |
|---|---|---|---|
| 2005/0105779 | A1 | 5/2005 | Kamei |
| 2005/0117870 | A1 | 6/2005 | Lee |
| 2005/0128221 | A1 | 6/2005 | Aratani et al. |
| 2005/0129276 | A1 | 6/2005 | Haynes et al. |
| 2005/0147302 | A1 | 7/2005 | Leung |
| 2005/0157952 | A1 | 7/2005 | Gohda et al. |
| 2005/0172215 | A1 | 8/2005 | Squibbs et al. |
| 2005/0196069 | A1* | 9/2005 | Yonaha .................. 382/282 |
| 2005/0207630 | A1 | 9/2005 | Chan et al. |
| 2005/0213793 | A1 | 9/2005 | Oya et al. |
| 2005/0285943 | A1* | 12/2005 | Cutler .................. 348/207.1 |
| 2006/0008145 | A1 | 1/2006 | Kaku |
| 2006/0008152 | A1 | 1/2006 | Kumar et al. |
| 2006/0032916 | A1 | 2/2006 | Mueller et al. |
| 2006/0050934 | A1 | 3/2006 | Asai |
| 2006/0053364 | A1 | 3/2006 | Hollander et al. |
| 2006/0071942 | A1 | 4/2006 | Ubillos et al. |
| 2006/0098737 | A1 | 5/2006 | Sethuraman et al. |
| 2006/0120572 | A1 | 6/2006 | Li et al. |
| 2006/0140455 | A1 | 6/2006 | Costache et al. |
| 2006/0161588 | A1 | 7/2006 | Nomoto |
| 2006/0171573 | A1 | 8/2006 | Rogers |
| 2006/0222243 | A1 | 10/2006 | Newell et al. |
| 2006/0251338 | A1 | 11/2006 | Gokturk et al. |
| 2007/0071323 | A1 | 3/2007 | Kontsevich et al. |
| 2007/0081744 | A1 | 4/2007 | Gokturk et al. |
| 2007/0098303 | A1 | 5/2007 | Gallagher et al. |
| 2007/0183638 | A1 | 8/2007 | Nakamura |
| 2007/0242856 | A1 | 10/2007 | Suzuki et al. |
| 2008/0080745 | A1 | 4/2008 | Vanhoucke et al. |
| 2009/0016576 | A1 | 1/2009 | Goh et al. |
| 2009/0160618 | A1 | 6/2009 | Kumagai et al. |

OTHER PUBLICATIONS

Michael Arrington, "First Screen Shots of Riya". Oct. 26, 2005.

"Notes and Tags". p. 3 pf 6. http://www.flickr.com/learn_more_3.gne, Jan. 4, 2006.

Riya—Photo Search. http://www.riya.com, Dec. 7, 2005.

Riya—Photo Search. http://www.riya.com/corp/learn-more.jsp, Dec. 7, 2005.

Riya—Photo Search. http://www.riya.com/corp/learn-more-s2.jsp, Dec. 7, 2005.

Riya—Photo Search. http://www.riya.com/corp/learn-more-s3.jsp, Dec. 7, 2005.

Riya—Photo Search. http://www.riya.com/corp/learn-more-s5.jsp, Dec. 7, 2005.

Riya—Photo Search. http://www.riya.com/corp/learn-more-s6.jsp, Dec. 7, 2005.

Gormish, Michael J.. "JPEG 2000: Worth the Wait?" Ricoh Silicon Valley, Inc. pp. 1-4, 1999.

Yang et al. "Detecting Faces in Images: A Survey." IEEE Transactions of Pattern Analysis and Machine Intelligence, vol. 4, No. 1. Jan. 2002, pp. 34-58.

Sun et al. "Quantized Wavelet Features and Support Vector Machines for On-Road Vehicle Detection." Dept. of Computer Science, U. of Nevada, Reno & e-Technology Dept., Ford Motor Company, Dearborn, MI. pp. 1-6, 2002.

Schneiderman, Henry. "A Statistical Approach to 3D Object Detection." Robotics Institute, Carnegie Mellon University, Pittsburgh, PA., 2000.

Yang, Ming-Hsuan. "Recent Advances in Face Detection." Honda Research Institute, Mountain View, CA., 2003.

U.S. Appl. No. 11/097,951, Newell et al.

Pentland et al. (Jun. 1996) "Photobook: Content-based manipulation of image databases," Int'l J. Computer Vision, vol. 18 No. 3, pp. 233-254.

Ma et al. (Sep. 2000) "An indexing and browsing system for home vido," Proc. 2000 European Signal Processing Conf., pp. 131-134.

* cited by examiner

EXPORTING EXTRACTED FACES

BACKGROUND OF THE INVENTION

Automatic detection processes can be used to detect objects in an image and can be a powerful tool. For example, a face detection process can detect faces of people in an image. With digital cameras becoming increasingly popular, more and more digital images are being created. Face detection technology enables management of the increasing number of digital images for personal and commercial use.

Although automatic detection may be powerful, there are some drawbacks associated with it. For one thing, automatic detection might not be available to some users. Current automatic detection processes may also require a noticeable amount of time to process images. This may be inconvenient, particularly if a large number of images are being processed. Techniques to address these issues may be useful.

BRIEF SUMMARY OF THE INVENTION

Information associated with automatic detection is exported. Information associated with an object resulting from automatic detection performed on an image is received. The object in some embodiments includes a portion of the image; in some embodiments, the object is associated with coordinates. An export indication is received. The export indication in some embodiments can be automatically generated or in some embodiments can be initiated by a user. Data associated with the object is exported. The exported data in some embodiments is saved to a file or a library.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Exporting information is disclosed. Information associated with an object resulting from automatic detection performed on an image is received. The object in some embodiments includes a portion of the image; in some embodiments, the object is associated with coordinates. An export indication is received. The export indication in some embodiments can be automatically generated or in some embodiments can be initiated by a user. Data associated with the object is exported. The exported data in some embodiments is saved to a file or a library.

Figure 1A:
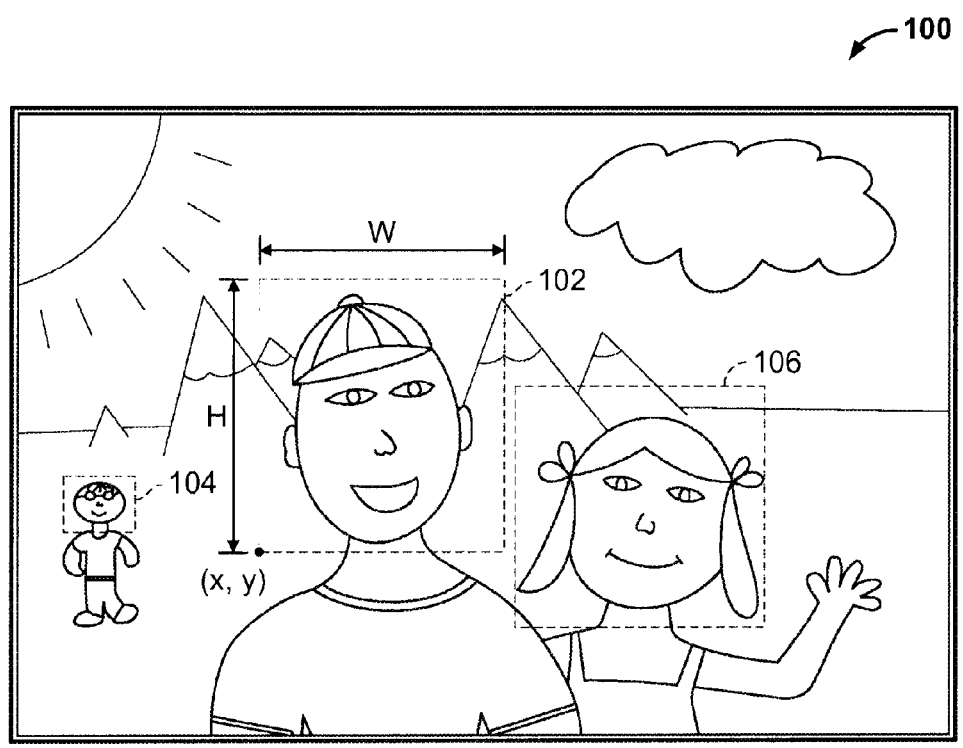
FIG. 1A is a diagram illustrating an embodiment of an image and objects that are detected from the image.

FIG. 1A is a diagram illustrating an embodiment of an image and objects that are detected from the image. In the example shown, image 100 may be a file in a variety of formats, including Joint Photographic Experts Group (JPEG), Graphics Interchange Format (GIF), Tagged Image File Format (TIFF), and Portable Network Graphics (PNG). In some embodiments, image 100 is generated using a digital camera. Although images may be described in the examples herein, any visual data (including video, streaming video, and graphical data) may be used.

Automatic detection processing is performed on image 100. Automatic detection processing detects occurrences of a detection object in an image. Automatic detection processing may be performed using various techniques. For example, Eigenfaces, Adaboost, neural networks, may be used. A two dimensional pattern matching technique may be used. A three dimensional model of the object may be used to approximate the object. In some embodiments, the detection object is a face and Adobe® Photoshop® Elements is used for automatic face detection.

Objects are output by an automatic detection process and are believed by the automatic detection process to include an occurrence of the detection object. Automatic detection processes do not necessarily attempt to detect a particular detection object (for example, the face of a particular person). Rather, the process may attempt to detect any occurrence of a detection object in an image (for example, the face of any person). In some embodiments, including this example, each object includes one and only one occurrence of a detection object. Examples of detection objects include a face, person, animal, car, boat, book, table, tree, mountain, etc.

Objects may be associated with a subimage or a portion of an image and may be described in a variety of ways. In this example, objects are approximated with a rectangular shape. In some embodiments, objects output by an automatic detection process have a non-rectangular shape, such as a round shape. Object 102 may be described by coordinates (x, y). Coordinates (x, y) may describe the location of the lower left corner of object 102 with respect to the origin (i.e., the lower left corner of image 100). A variety of units may be used for coordinates (x, y), such as pixels or millimeters. Object 102 in this example is also described by a height, H, and a width, W. In some embodiments, objects output by an automatic detection process have a fixed aspect ratio (i.e., a fixed width to height ratio). For example, although the sizes of objects 102 and 104 are different, the aspect ratios of the two objects may be the same.

Additional information associated with each object may be output by an automatic detection process. In some embodiments, a probability that a given object includes an occurrence of the detection object is output. For example, a face detection process may generate a probability that object 106 includes a face. In some embodiments, one or more angles are output by an automatic detection process. An angle may be associated with an orientation, rotation, or tilt of the occurrence of the detection object. For example, one angle may describe the tilt of the face with respect to a vertical axis. Another angle may describe the rotation of the face.

Automatic detection processes can be imperfect. Sometimes, an automatic detection process may not be able detect an occurrence of a detection object. For example, some face detection processes may not be able to detect the face of a person if the face is too small in an image. An automatic detection process can also generate "false alarms." A face detection process may output an object that does not include a face.

In some embodiments, subsequent processing may be performed on an image or an associated object after automatic detection processing. In some embodiments, automatic object identification is performed. For example, a face identification process may be performed where detected objects are evaluated to determine whether the objects contain the face of a particular person. Identification may be performed using various techniques. For example, a technique based on Adaboost, Linear Discriminant Analysis (LDA), or principal component analysis (PCA) may be used to perform object identification. In some embodiments, an automatic matching process is performed. For example, a face matching process is performed, where multiple objects from multiple images are compared and similar faces are matched together.

Object detection may be automatic or manual. For example, a user may have drawn a box around any of faces 102, 104, and 106 to detect a face. The output of a manual detection process may include the same information as the output of an automatic detection process. The probability that a manually detected object includes the detection object may be set to 1.

It may be useful to export data associated with an object. For example, some users may not have access to face detection technology but may wish to use face detection results. By exporting data, another application may be able to import and use data associated with objects, even if the importing application does not have automatic detection capabilities. In some embodiments, the exported data is saved to a file or library. Performing automatic detection may take a noticeable amount of time, and storing data associated with objects may in the future enable faster usage of information resulting from automatic detection.

Figure 1B:
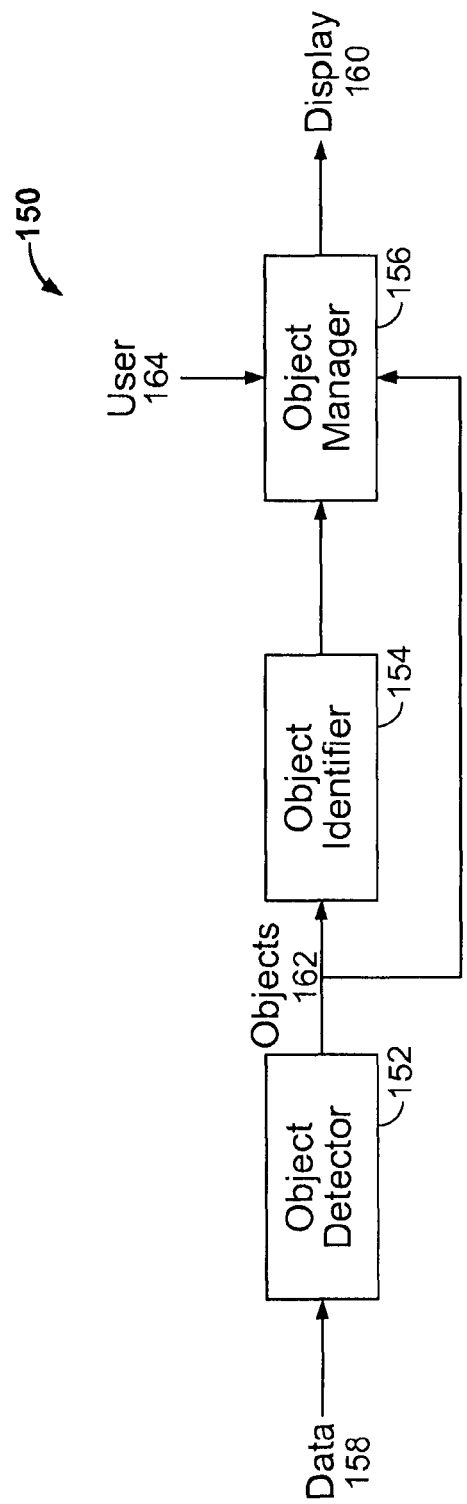
FIG. 1B is a block diagram illustrating an embodiment of a system for detecting and processing objects.

FIG. 1B is a block diagram illustrating an embodiment of a system for detecting and processing objects. In this example, system 150 includes object detector 152, object identifier 154, and object manager 156. Data 158 is input to object detector 152. Data 158 may include an image, video, audio clip, and/or other data. Object detector 152 performs an object detection process to detect occurrences of detection objects in data 158. Object detector 152 may detect any occurrence of a detection object (e.g., any face). Object detector 152 provides detected objects 162 as output.

Objects 162 are provided as input to object identifier 154, which identifies detection objects. For example, object detector 152 may detect any face, and object identifier 154 may identify the face as belonging to a specific person. Object identifier may output one or more names associated with one or more of objects 162. In some embodiments, object identifier 154 assigns a tag (such as the tag "Bob") to an object. Objects 162 and the output of object identifier 154 are provided as input to object manager 156. User input 164 may also be provided as input to object manager 156.

Object manager 156 manages objects 162. In some embodiments, object manager 156 exports data. Data exported by object manager 156 may be associated with objects 162 and may include coordinates, heights, widths, etc.

Figure 2:
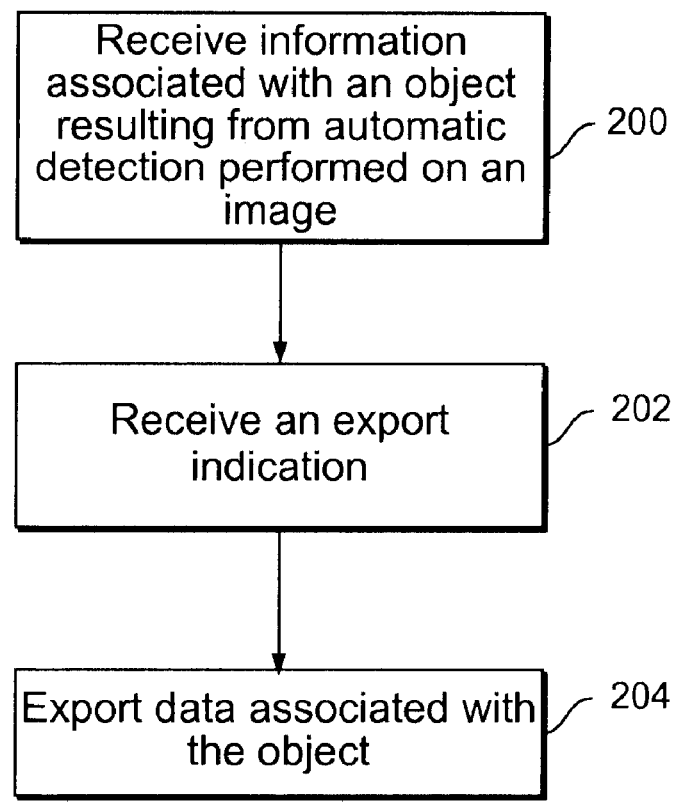
FIG. 2 is a flowchart illustrating an embodiment of exporting data associated with an object resulting from automatic detection.

FIG. 2 is a flowchart illustrating an embodiment of exporting data associated with an object resulting from automatic detection. In the example shown, a variety of devices or applications may be able to import the exported data. At 200, information associated with an object resulting from automatic detection performed on an image is received. For example, the heights, widths, and coordinates of objects 102, 104, and 106 may be obtained. A link, identifier, reference, or pointer associated with image 100 may also be obtained. In some embodiments, exporting is performed by the same process that performs automatic detection, and the information is obtained as soon as automatic detection is performed.

An export indication is received at 202. In some embodiments, the export indication is triggered by a user. For example, a user may trigger an export indication by clicking a button or selecting a command from a pull down menu that is associated with exporting data. In some embodiments, the export indication is automatically triggered. For example, some or all of the results from automatic detection may automatically be saved after automatic detection is performed. In some embodiments, a user's action automatically triggers the export indication. A user may not necessarily be aware that an export indication to export information is being triggered.

At 204, data associated with the object is exported. In some embodiments, the exported data is saved to a file. For example, object 102 may be saved to a new JPEG file. The new file may or may not include a reference to the image from which the object is detected. In some embodiments, the exported data is saved to a library. A saved file or library may be imported into another application, which may not necessarily have automatic detection capabilities.

The exported data can include a variety of information. In some embodiments, the exported data includes a link to or a copy of the image from which an object is detected. The height, width, coordinates, or other location or positional information associated with an object may be included in the exported data. Other information resulting from the automatic detection process may be exported. In some embodiments, results from a face identification process or a face matching process are exported. In some embodiments, the exported data includes tag information.

In one embodiment of exporting data, object related information is automatically exported to a library after automatic detection is performed. The application that performs automatic detection may be used to view detected objects, and the library may be accessible to that application. After generating objects 102, 104, and 106, the application may automatically save the coordinates, heights and widths of each object to its library. If image 100 is subsequently viewed, the library may be accessed, and objects 102, 104, and 106 may be displayed with image 100. The display may be similar that of image 100, where a rectangle indicates the portion of an image associated with an object. In some embodiments, other information (such as a probability or an angle) is automatically saved to the library.

In another embodiment, a user selects objects, and data associated with the selected objects are exported to a file. All faces detected from a collection of photographs may be presented to a user. In some embodiments, the user may use an input device (such as a stylus or a mouse) to select from the presented faces. In some embodiments, objects are selected based on a tag that is assigned to the object. For example, all faces with a tag name of "Bob" may be selected. To save the selected faces, a user may push a button or perform a defined sequence of inputs using an input device. A new file may be generated for each saved face. In some embodiments, a new file contains only the portion of the image associated with that object. For example, a new file created for object 102 may contain only the portion within the dashed boundary of object 102. Using the new file, it may be impossible to change the cropping of object 102 so that more of the mountains in the background are included in object 102. In some embodiments, a copy or a reference to an associated image is saved to the file. Using a saved copy of or a saved reference to image 100, it may be possible to adjust the cropping of object 102 so that more of the background is included.

In some embodiments, a user action triggers data associated with an object to be exported. A user may not necessarily be aware that his action has triggered data to be exported. In one example, faces are exported once they are tagged. Object 102 is tagged and data associated with the object is exported. Data associated with objects 104 and 106 are similarly exported when those objects are tagged. In some embodiments, a destination to which data is exported to is based upon a tag. For example, if object 102 is tagged "Bob," data associated with object 102 may be exported and saved to a library associated with the tag "Bob." Alternatively, object 102 is exported and saved to a JPEG file with a file name that includes the tag word "Bob." There may be more than one object tagged with a particular tag, so a file name may be Bob_<counter>, where an appropriate counter value is used to create unique file names. Other user actions besides tagging can trigger data associated with an object to be exported.

Figure 3:
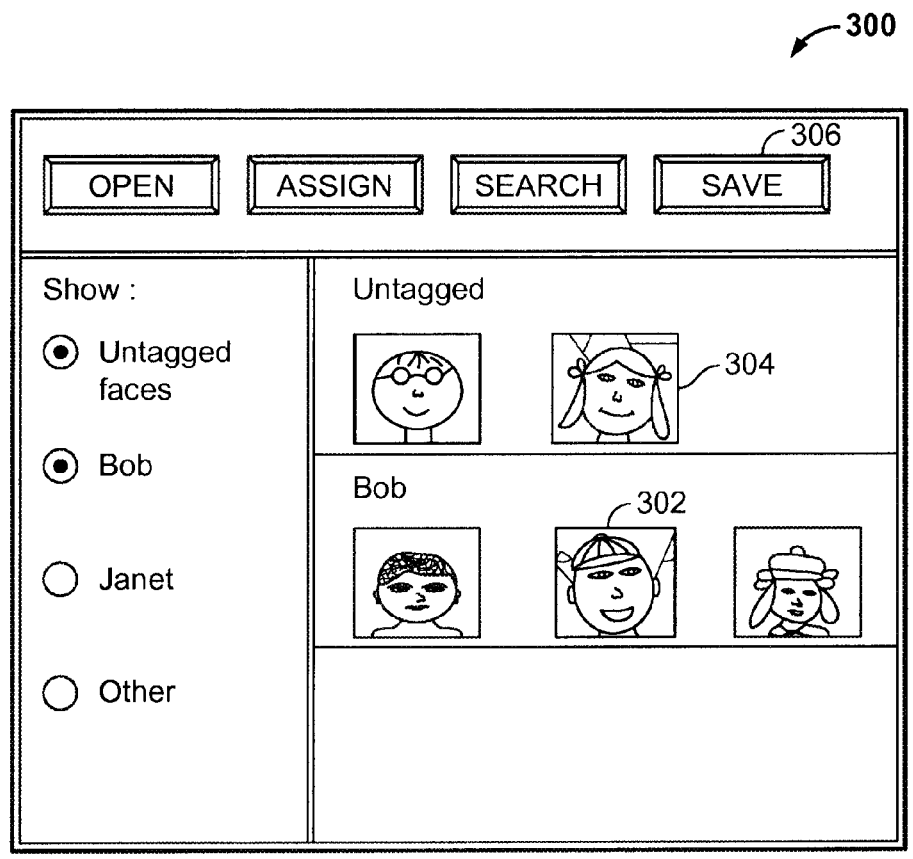
FIG. 3 is an embodiment of an interface that may be used to select objects to be exported.

FIG. 3 is an embodiment of an interface that may be used to select objects to be exported. In the example shown, display of interface 300 with the detected objects may be triggered after face detection is performed. Using interface 300, a user can control the objects selected and the destination to which data associated with the selected objects is exported. Some of the objects in this example are tagged while other objects are untagged. Object 302, for example, has been assigned a tag with a tag word of "Bob" while object 304 is untagged.

To select objects to be exported, an input device may be used to interact with interface 300. The input device can be a mouse, a stylus, or a touch sensitive display. Using an input device, objects may be selected from the objects displayed in interface 300. For example, by placing a mouse cursor over object 304 and clicking the mouse, object 304 may be selected. Clicking an object may toggle the object between a selected and an unselected state. If a user clicks object 302 after selecting object 304, object 302 is selected in addition to object 304. Clicking a mouse cursor above object 302 one more time unselects object 302. In some cases, all objects are selected and exported. Objects can be selected based on a tag. For example, all objects with the tag word "Bob" may be selected. Objects can also be selected based on a criterion. For example, the criterion may be to select all objects with the tag word "Janet" that have not been saved. In another example, all objects associated with certain images are exported.

In some embodiments, interface 300 may be used to specify which pieces of data associated with a selected object are exported. For example, an automatic detection process may generate data in addition to height, width, and coordinates. The additional data may include a probability that the object includes an occurrence of the detection object or an angle associated with the occurrence of the detection object. A user may be able to specify what additional data, if any, is exported.

Save button 306 can be used to trigger an indication to export data associated with the selected objects. Activating save button 306 may trigger display of a window for a user to specify the destination to which the selected objects are exported. Using the window, a user may be able to specify that the exported data is saved to a file or a library. A user may also be able to specify the name of a new destination, or the name of an existing destination to which the data is exported.

In some applications, memory capacity is limited. For example, if the user is a professional wedding photographer, she may have many images that have many objects detected using face recognition. However, her computer or a peripheral storage system may have a limited amount of storage capacity. The amount of memory consumed may be considered when exporting data. In some embodiments, a user is informed or queried regarding a decision that affects the amount of memory consumed. For example, if a user chooses to export data associated with an object two or more times, a window may be presented saying, "That object has already been saved. Would you still like to save it?" A user may be presented with a choice of, "1) Save all information associated with the object. I know this will take more memory, but I will be able to adjust the object later. 2) Save less information associated with the object. I may not be able to adjust the object later, but I want to save memory." In some embodiments, a user's selection is stored by interface 300. When interface 300 is subsequently run, interface 300 can recall a user's selection and enter a memory conservation mode or a save everything mode. The data selected to be exported or the format in which exported data is saved may affect memory consumption. To achieve a desired memory consumption goal, data may be selected, formatted, or stored using an appropriate technique.

In some embodiments, the interface used varies from that of interface 300. For example, an interface may have no concept of tags, and an interface may not necessarily display objects based on a tag. Faces 302 and 304 may, for example, be displayed based on a date. The date may be the date a photograph is taken, or may be the date automatic detection is performed. In some embodiments, a sequence of interactions or an input device used differs from that described in this example. For example, instead of using a mouse as an input device, a touch sensitive display may be used.

Figure 4:
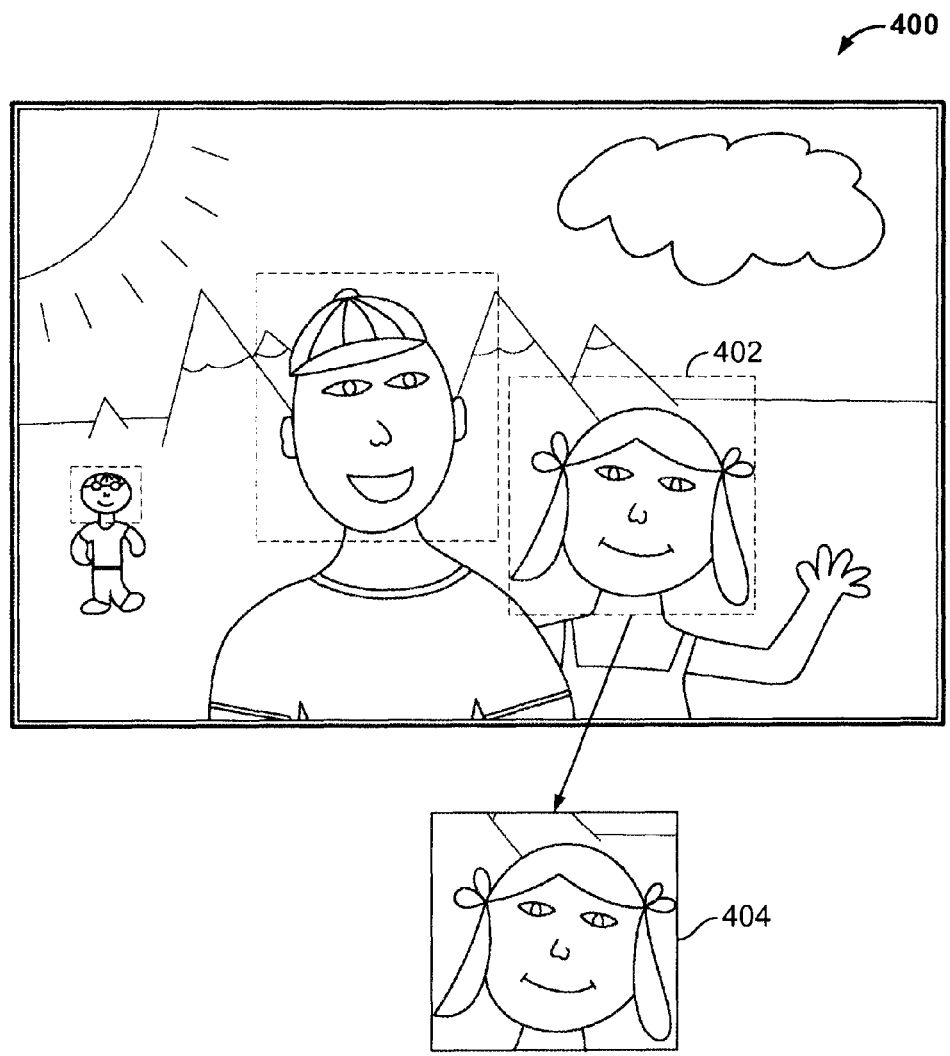
FIG. 4 is a diagram illustrating an embodiment of exporting data associated with an object resulting from automatic detection to a file.

FIG. 4 is a diagram illustrating an embodiment of exporting data associated with an object resulting from automatic detection to a file. In the example shown, object 402 is detected from image 400 using a face detection process. File 404 is created using object 402 and may be in a variety of formats, including JPEG. In some embodiments, unless otherwise specified, file 404 is saved in the same format as image 400.

The coordinates, height, and width generated by an automatic detection process describe the portion of an image that corresponds to an object. Information associated with that portion of the image may be exported to file 404. In some embodiments, file 404 contains an exact copy of data associated with that portion of image 400. In some embodiments, file 404 contains modified information. For example, the data saved to file 404 may be a lower resolution that that of image 100.

File 404 may be used in a variety of ways. File 404 can be transmitted to another user or another application, for example as an email attachment. Another application that imports file 404 may not necessarily have automatic detection capabilities. By importing file 404, other applications may be able to use data resulting from automatic detection even if the importing application does not have that capability. The other applications may be an image storage or management application such as iPhoto®. A collection of faces may be gathered using the application. The importing application may be associated with designing webpages or layouts, such as Adobe InDesign® or Adobe Illustrator®. After importing file 404 into an application, the content of file 404 may be modified. The shading, tinting, or color of the girl's face in file 404 can be modified. Resolution, focus, zoom, or scaling may also be adjusted.

In one example of how a file such as file 404 is used, a face book is created. For example, a face book of students in a class, workers in a particular project group, or family members can be created. People may submit photographs of themselves and faces from the submitted photographs are used to create the face book.

Figure 5:
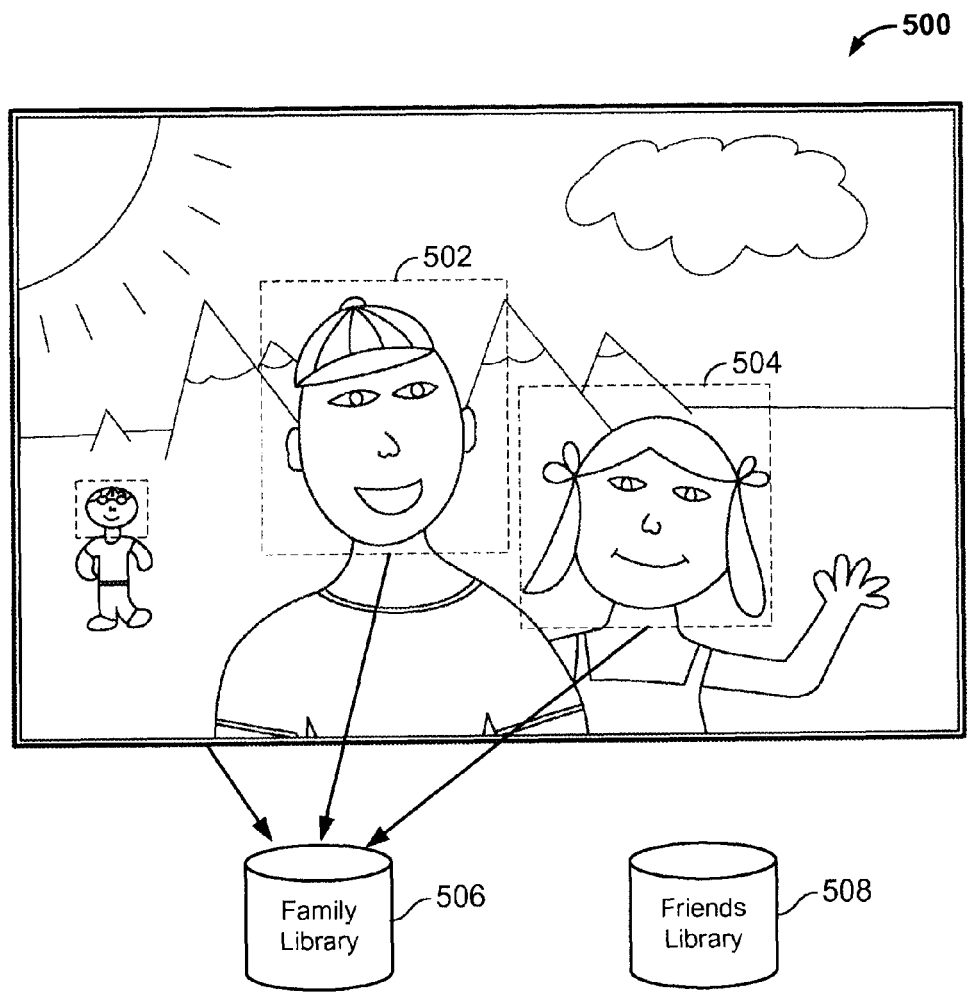
FIG. 5 is a diagram illustrating an embodiment of exporting objects resulting from automatic detection to a library.
Figure 6:
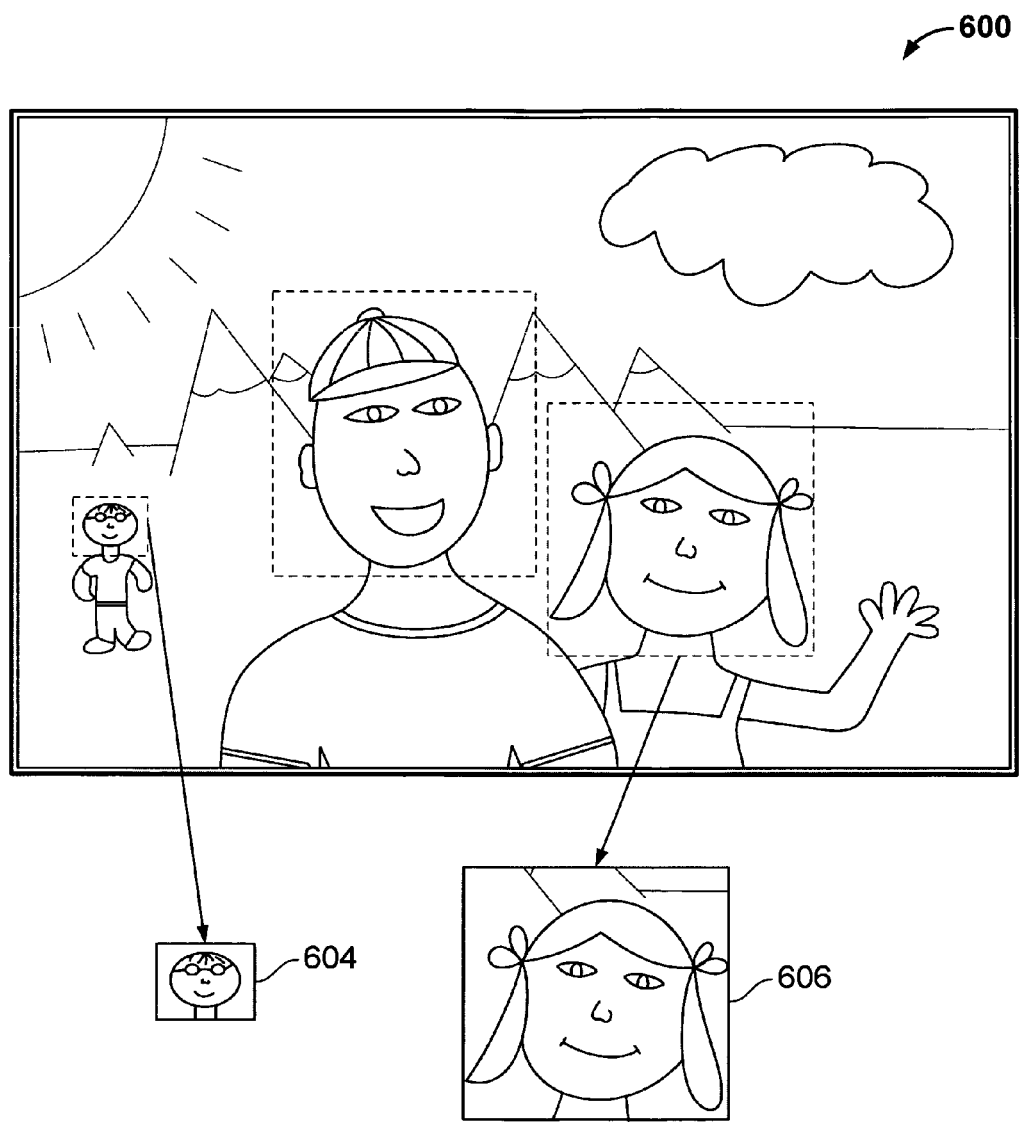
Figure 7:
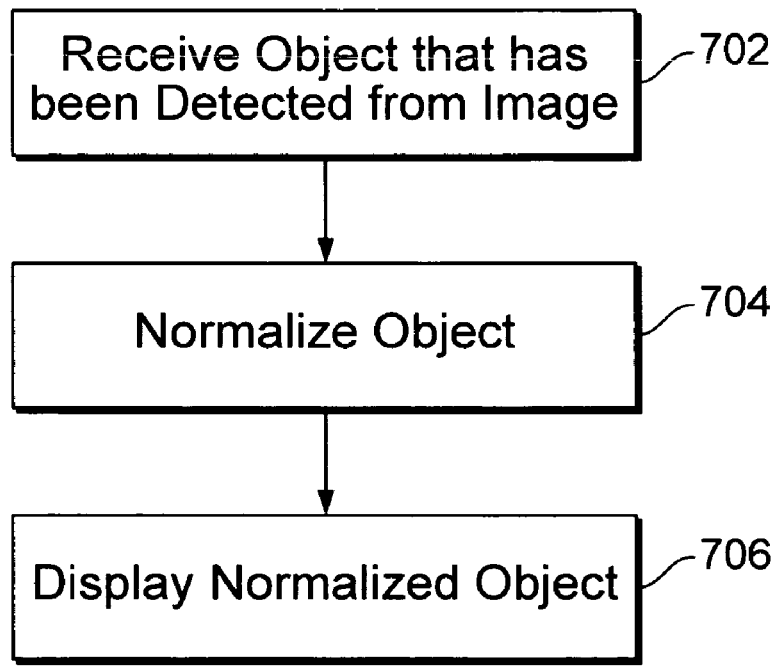
Figure 8A:
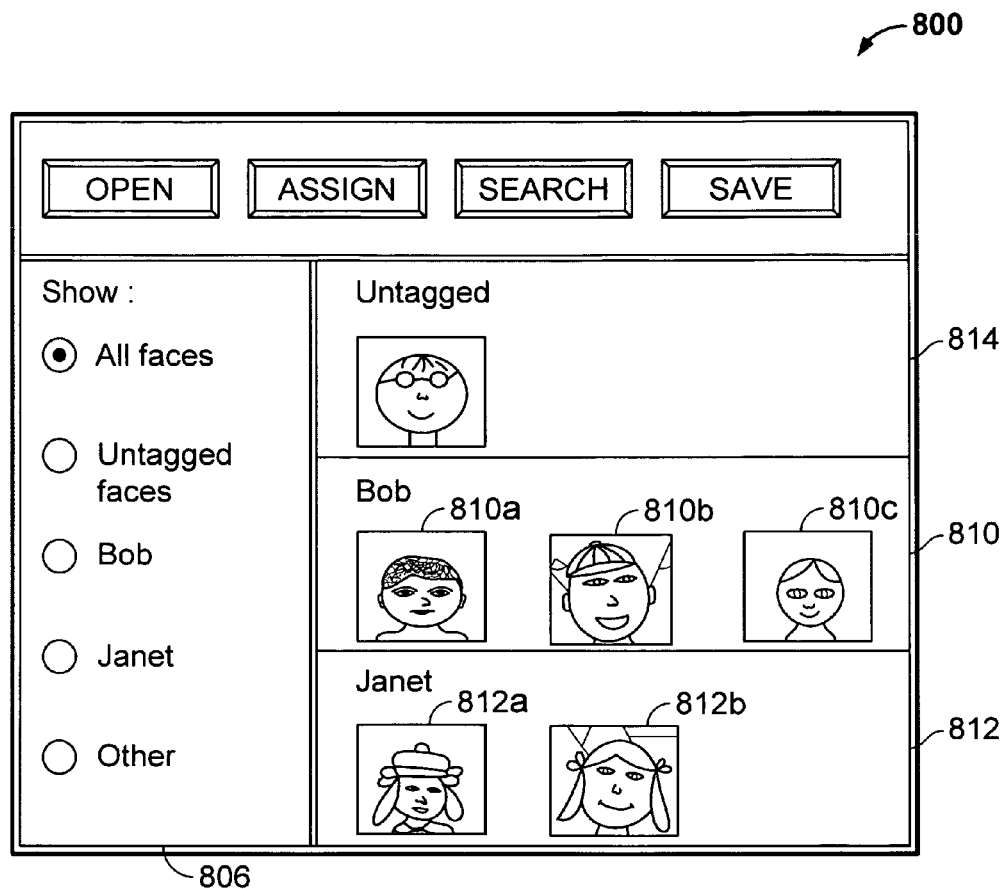
Figure 8B:
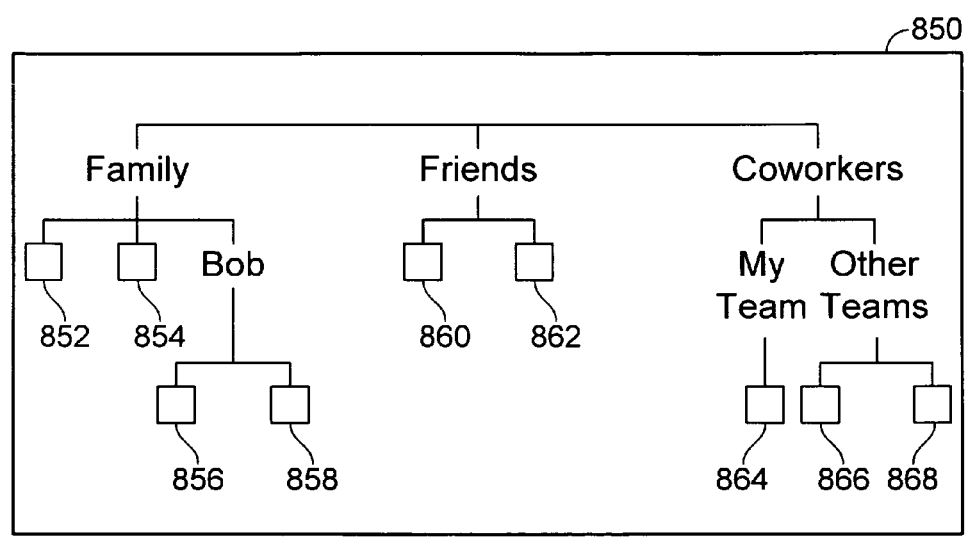
Figure 9:
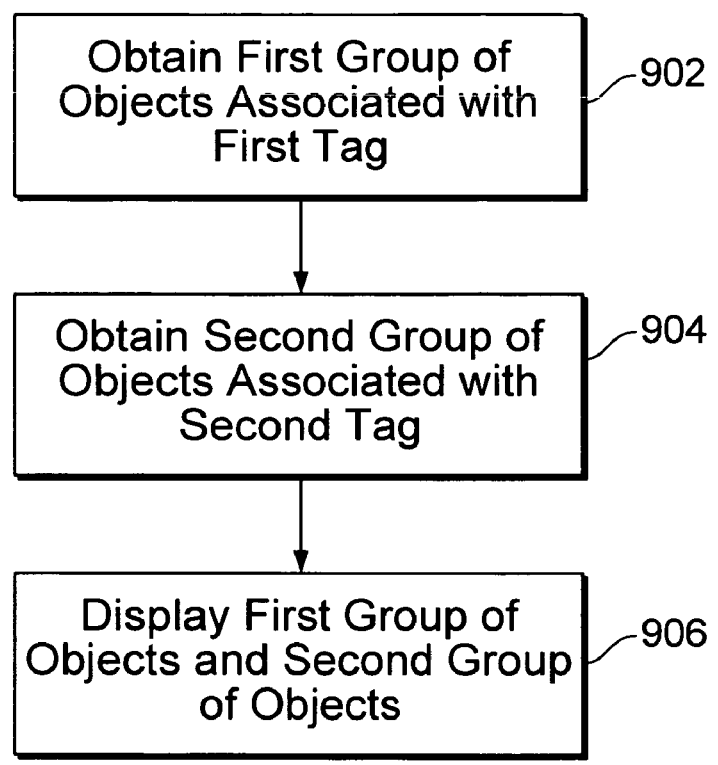
Figure 10:
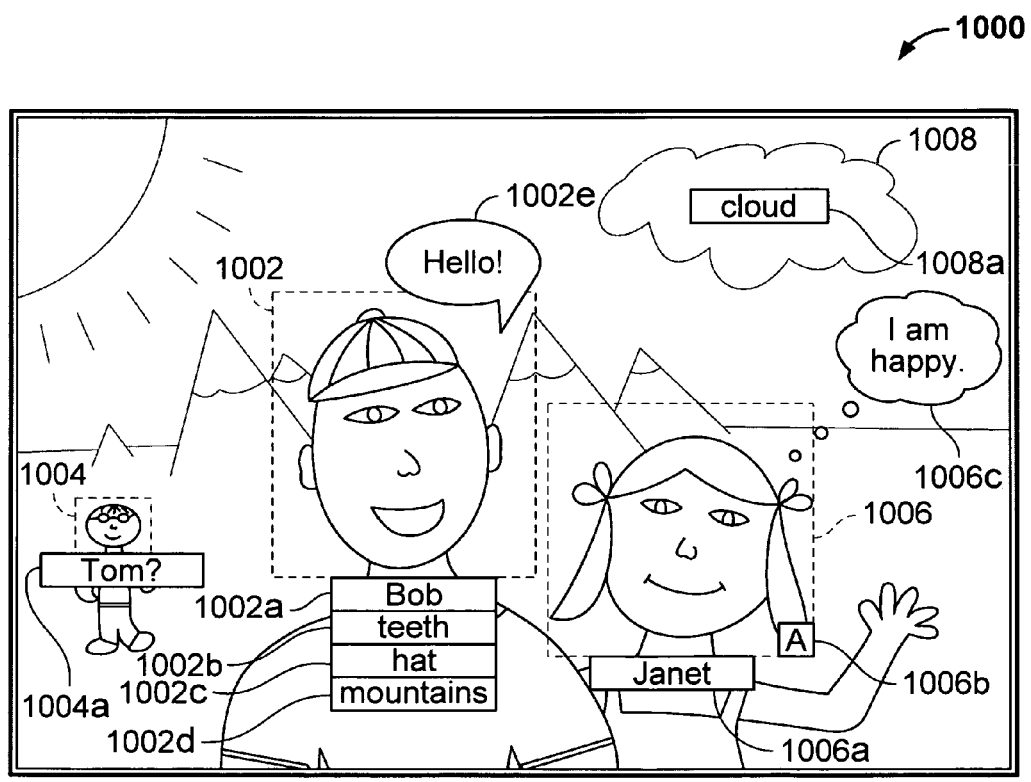
Figure 11:
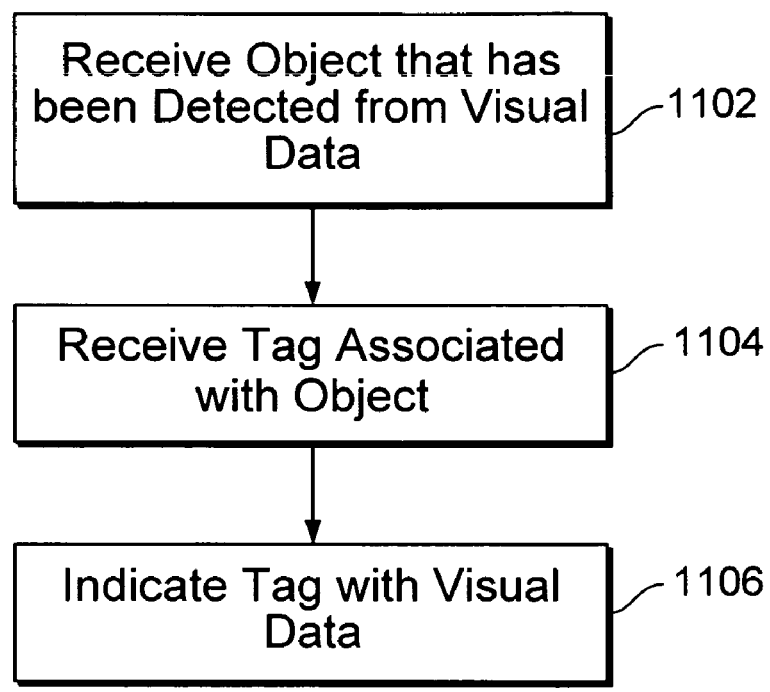
Figure 12:
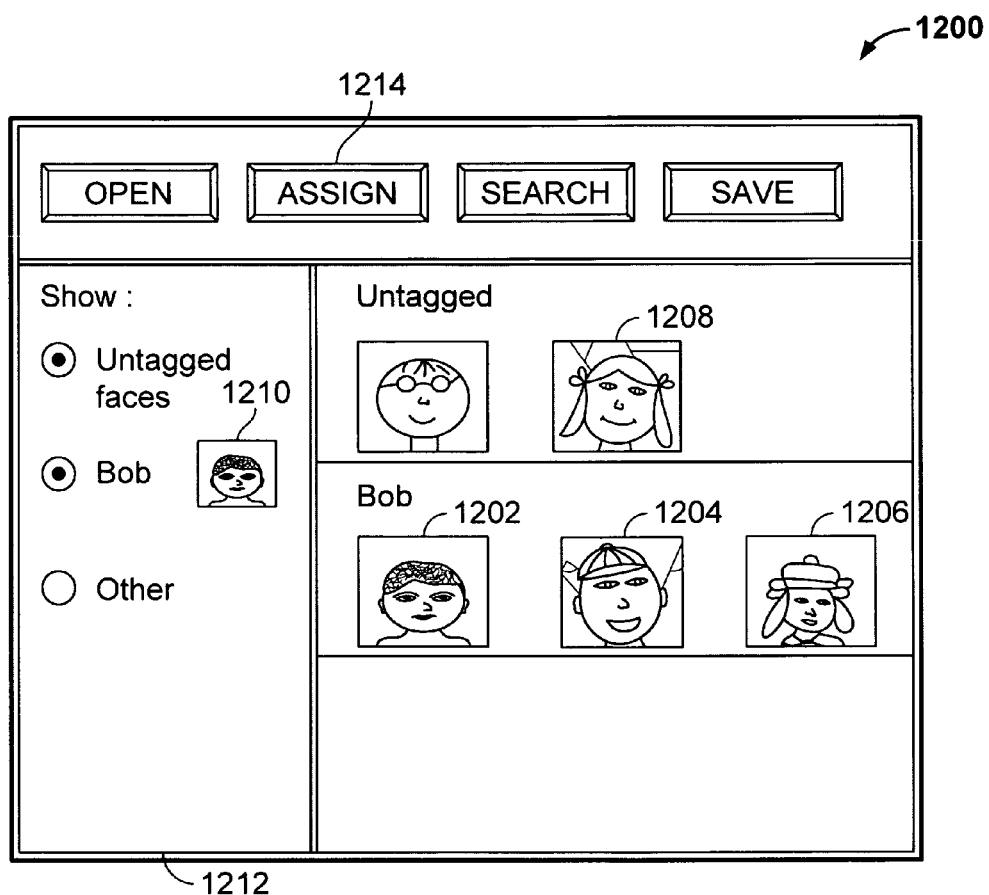
Figure 13:
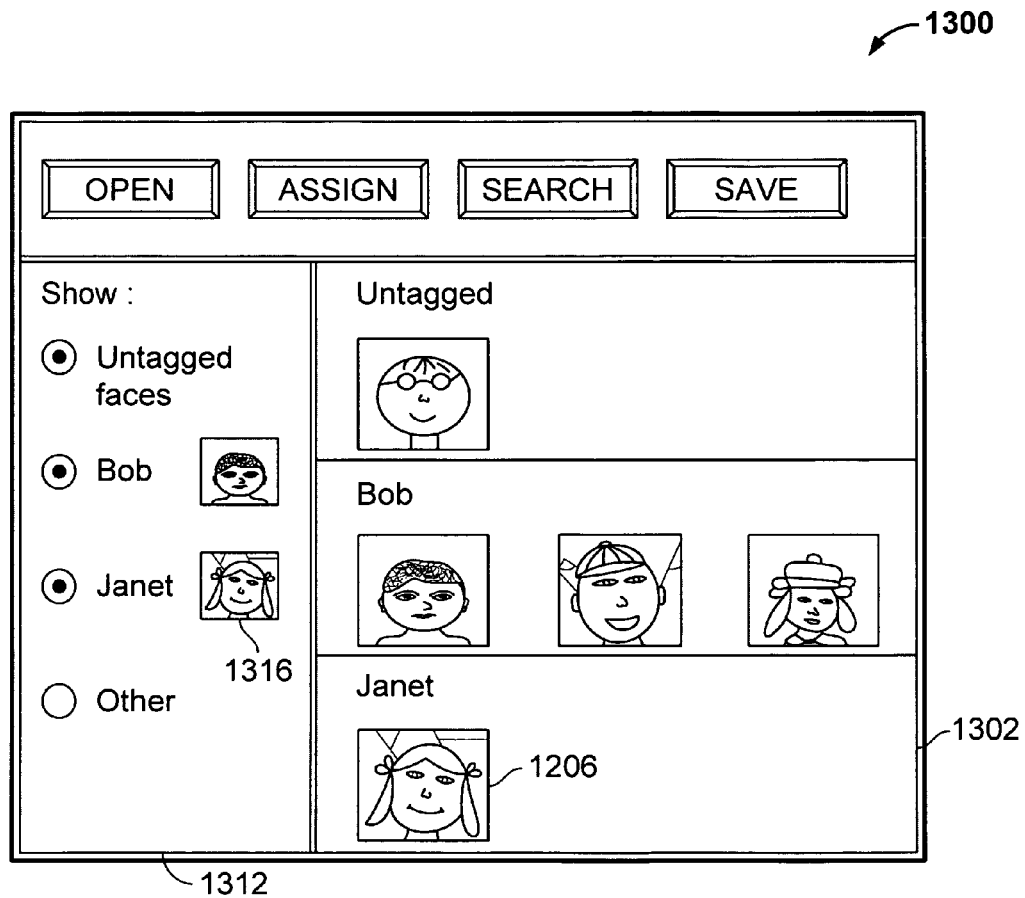
Figure 14:
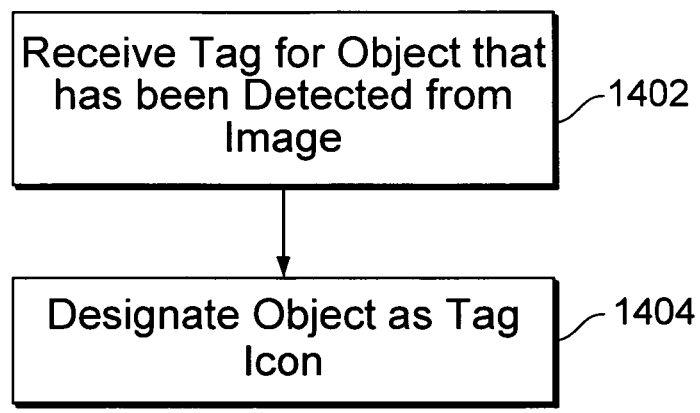

FIG. 5 is a diagram illustrating an embodiment of exporting objects resulting from automatic detection to a library. In the example shown, objects 502 and 504 result from face detection performed on image 500. The two images are exported to family library 506. In some cases, libraries have special properties or conveniences associated with them. A library may be in a format that reduces the amount of time used by an application to load the library. The amount of time to load a library may take less time than loading equivalent files. In some cases, libraries are automatically detected and loaded by an application. When an application is started, the application may look in defined directories and automatically load detected libraries without any prompting by a user. A library may be configured to be accessible to a variety of applications.

Family library 506 is used to store faces of relatives and friends library 508 is used to store faces of friends. Although two libraries are shown in this example, the diagram illustrated is conceptual in nature. Libraries 506 and 508 may be part of the same library, separated by a logical separator or managed as two independent collections of information. In some embodiments, a user has some degree of control of creation and management of libraries. A novice user may only have a few objects that are detected from images. A single, default library may be sufficient. A more expert user may choose to create a new library and assign the library a name. For example, a professional wedding photographer may create a library for each wedding.

Table 1 illustrates an embodiment of data associated with objects stored in a library. Data for multiple objects are stored in the library and are organized in a table. Tables such as these may be stored in family library 506. For each object, such as objects 502 and 504, an object ID and a source ID file are stored. The object ID is a unique identifier associated with an object. The source ID file identifies the image that the object was detected from. An image may include more than one object, so multiple objects may have the same source file ID. The coordinates, width, height, angle, and probability are output by an automatic detection process. The data field records when the automatic detection process was performed.

TABLE 1

| Object ID | Source File ID | Coordinates of Origin | Width | Height | Angle | P(Object = Detection Object) | Date Object Detected |
|---|---|---|---|---|---|---|---|
| 1 | 1 | x0, y0 | 5 | 8 | 0 | 0.8 | Jan. 1, 2005 |
| 2 | 1 | x1, y1 | 5 | 7 | 0 | 0.7 | Jan. 1, 2005 |
| 3 | 1 | x2, y2 | 1 | 1 | 0 | 0.5 | Jan. 1, 2005 |
| 4 | 2 | x3, y3 | 2 | 2 | 10 | 0.6 | Nov. 2, 2005 |
| 5 | 2 | x4, y4 | 3 | 4 | 20 | 0.7 | Nov. 3, 2005 |

In some embodiments, some columns in the example table are not saved to a library. For example, the probability or angle may not necessarily be saved to a library. Memory consumption may be considered in determining which pieces of data associated with an object to export.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, at a processor, an object resulting from automatic detection performed on an image using a first application, wherein the object includes a portion of the image;
   receiving, at the processor, an indication to export information;
   in response to receiving the indication, using the processor to export data associated with the object to a library, wherein:
   exporting includes saving the data associated with the object to storage;
   the data associated with the object includes location information that identifies where the portion of the image is located within the image; and
   in the event a second application which is unable to perform automatic detection is initiated, the second application automatically searches for the library containing the saved data.

2. A method as recited in claim 1, wherein the automatic detection detects a detection object, including a face.

3. A method as recited in claim 1, wherein the exported data is capable of being imported by a second application other than a first application that performed the automatic detection.

4. A method as recited in claim 1, wherein exporting data includes saving to a library.

5. A method as recited in claim 1, wherein the location information includes coordinates.

6. A method as recited in claim 1 further including selecting the object based at least in part on a criterion.

7. A method as recited in claim 1 further including selecting the object based at least in part on a tag.

8. A method as recited in claim 1 further including selecting the object based at least in part on user input.

9. A method as recited in claim 1, wherein the indication is automatically triggered.

10. A method as recited in claim 9, wherein the indication is automatically triggered in the event a user assigns a tag to the object.

11. A method as recited in claim 1, wherein the indication is initiated by a user.

12. A method as recited in claim 1, wherein the data includes information associated with the automatic detection.

13. A method as recited in claim 1, wherein the data includes a reference to the image.

14. A method as recited in claim 1, wherein the exported data further includes an angle associated with an orientation of the object.

15. A method as recited in claim 14, wherein the exported data further includes a probability.

16. A system, comprising:
    a processor; and
    a memory coupled with the processor, wherein the memory is configured to provide the processor with instructions which when executed cause the processor to:
        receive an object resulting from automatic detection performed on an image using a first application, wherein the object includes a portion of the image;
        receive an indication to export information; and
        in response to receiving the indication, export data associated with the object to a library, wherein:
            exporting includes saving the data associated with the object to storage;
            the data associated with the object includes location information that identifies where the portion of the image is located within the image; and
            in the event a second application which is unable to perform automatic detection is initiated, the second application automatically searches for the library containing the saved data.

17. A system as recited in claim 16, wherein the exported data further includes an angle associated with an orientation of the object.

18. A system as recited in claim 17, wherein the exported data further includes a probability.

19. A computer program product, the computer program product being embodied in a computer readable storage medium and comprising computer instructions for:
    receiving an object resulting from automatic detection performed on an image using a first application, wherein the object includes a portion of the image;
    receiving an indication to export information; and
    in response to receiving the indication, exporting data associated with the object to a library, wherein:
        exporting includes saving the data associated with the object to storage;
        the data associated with the object includes location information that identifies where the portion of the image is located within the image; and
        in the event a second application which is unable to perform automatic detection is initiated, the second application automatically searches for the library containing the saved data.

20. A computer program product as recited in claim 19, the computer program product further comprising computer instructions for selecting the object based at least in part on a criterion.

21. A computer program product as recited in claim 19, wherein the data includes information associated with the automatic detection.

22. A computer program product as recited in claim 19, wherein the exported data further includes an angle associated with an orientation of the object.

23. A computer program product as recited in claim 22, wherein the exported data further includes a probability.

* * * * *